(12) United States Patent
Suzuki et al.

(10) Patent No.: US 9,123,243 B2
(45) Date of Patent: Sep. 1, 2015

(54) VEHICLE CONTROL DEVICE

(75) Inventors: Takashi Suzuki, Susono (JP); Koji Taguchi, Isehara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 219 days.

(21) Appl. No.: 13/522,213

(22) PCT Filed: Jan. 15, 2010

(86) PCT No.: PCT/JP2010/050414
§ 371 (c)(1),
(2), (4) Date: Jul. 13, 2012

(87) PCT Pub. No.: WO2011/086686
PCT Pub. Date: Jul. 21, 2011

(65) Prior Publication Data
US 2013/0060416 A1  Mar. 7, 2013

(51) Int. Cl.
*G08G 1/0968* (2006.01)
*G01C 21/34* (2006.01)

(52) U.S. Cl.
CPC ...... *G08G 1/096827* (2013.01); *G01C 21/3446* (2013.01)

(58) Field of Classification Search
CPC .................................................. G01C 21/3446
USPC ............. 701/23, 25, 410, 421, 429, 467, 411, 701/416
See application file for complete search history.

(56) References Cited

U.S. PATENT DOCUMENTS

| 4,774,672 | A | * | 9/1988 | Tsunoda et al. | 701/447 |
| 5,557,522 | A | * | 9/1996 | Nakayama et al. | 701/410 |
| 5,684,704 | A | * | 11/1997 | Okazaki | 701/25 |
| 5,899,955 | A | * | 5/1999 | Yagyu et al. | 701/410 |

(Continued)

FOREIGN PATENT DOCUMENTS

| JP | 10 100737 | 4/1998 |
| JP | 2008 6993 | 1/2008 |

(Continued)

OTHER PUBLICATIONS

International Search Report Issued Apr. 27, 2010 in PCT/JP10/50414 Filed Jan. 15, 2010.
International Preliminary Report on Patentability Issued Aug. 7, 2012 in PCT/JP10/50414 Filed Jan. 15, 2010.

*Primary Examiner* — Tuan C. To
*Assistant Examiner* — Dale W Hilgendorf
(74) *Attorney, Agent, or Firm* — Oblon, McClelland, Maier & Neustadt, L.L.P.

(57) ABSTRACT

Disclosed is a vehicle control device capable of reducing calculation time while securing precision of a traveling plan in an arbitrary section. The vehicle control device controls a vehicle along a traveling plan calculated in accordance with a traveling path to a destination of the vehicle. The vehicle control device includes a traveling path setting unit which sets the traveling path from the current position of the vehicle to the destination, a traveling path division unit which divides the traveling path into a first section and a second section, and a traveling plan calculation unit which calculates a first traveling plan according to the first section and a second traveling plan according to the second section. The traveling plan calculation unit coarsens calculation granularity in the second traveling plan compared to calculation granularity in the first traveling plan.

6 Claims, 13 Drawing Sheets

(56) References Cited

U.S. PATENT DOCUMENTS

| | | | |
|---|---|---|---|
| 5,938,720 A * | 8/1999 | Tamai | 701/533 |
| 6,185,496 B1 * | 2/2001 | Matsuno | 701/409 |
| 6,795,769 B2 * | 9/2004 | Kaji et al. | 701/416 |
| 7,110,879 B2 * | 9/2006 | Friedrichs et al. | 701/421 |
| 7,395,153 B1 * | 7/2008 | Nesbitt et al. | 701/428 |
| 2005/0033516 A1 * | 2/2005 | Kawasaki | 701/301 |

FOREIGN PATENT DOCUMENTS

| | | |
|---|---|---|
| JP | 2008 108247 | 5/2008 |
| JP | 2008 129804 | 6/2008 |
| JP | 2008 230467 | 10/2008 |
| JP | 2009 133779 | 6/2009 |
| JP | 2009 179215 | 8/2009 |

* cited by examiner

VEHICLE CONTROL DEVICE

TECHNICAL FIELD

The present invention relates to a vehicle control device, and specifically, to a vehicle control device which calculates a traveling plan in accordance with a traveling path and controls a vehicle on the basis of the calculated traveling plan.

BACKGROUND ART

In the related art, as a device which calculates a traveling plan of a vehicle, a device which stratifies a traveling plan into an upper level plan and a lower level plan, and calculates the upper level plan and the lower level plan is known (see Patent Literature 1). In the device described in Patent Literature 1, the upper level plan is calculated in accordance with the traveling policy of the vehicle, and the lower level plan is calculated in accordance with changes in the ambient environment. Accordingly, in the device described in Patent Literature 1, traveling plan calculation which flexibly copes with changes in the ambient environment while satisfying the traveling policy of the vehicle is realized.

CITATION LIST

Patent Literature

[Patent Literature 1] Japanese Unexamined Patent Application Publication No. 2008-129804

SUMMARY OF INVENTION

Technical Problem

On the other hand, even if the traveling plan is calculated in the device as described above, when the ambient environment of the vehicle during traveling significantly changes, it is necessary to recalculate a traveling plan. However, if a long period of time is required to recalculate a traveling plan, the vehicle moves during this time and the ambient environment changes, making it difficult to appropriately reflect the actual ambient environment in the traveling plan. For this reason, there is a strong demand for reducing calculation time in the traveling plan.

Accordingly, an object of the invention is to provide a vehicle control device which calculates a first traveling plan and a second traveling plan having calculation granularity coarser than the first traveling plan as a traveling plan, thereby achieving reduction in calculation time while securing precision of a traveling plan in an arbitrary section.

Solution to Problem

The invention provides a vehicle control device which controls a vehicle along a traveling plan calculated in accordance with a traveling path to a destination of the vehicle. The vehicle control device includes a traveling path setting unit which sets the traveling path to the destination, a traveling path division unit which divides the traveling path into a first section and a second section, and a traveling plan calculation unit which calculates a first traveling plan according to the first section and a second traveling plan according to the second section. The traveling plan calculation unit coarsens calculation granularity in the second traveling plan compared to calculation granularity in the first traveling plan. Note that calculation granularity refers to the level of calculation processing, and as the calculation granularity is coarse, while the precision of a traveling plan is degraded, the calculation time is reduced.

With the vehicle control device according to the invention, the first traveling plan and the second traveling plan in which calculation granularity is coarse and calculation processing is simple compared to the first traveling plan are calculated as the traveling plan, thereby reducing the calculation time in exchange for degradation in precision of the traveling plan compared to a case where the entire traveling plan is calculated with the same calculation granularity as the first traveling plan. Therefore, with this vehicle control device, it is possible to achieve reduction in the calculation time of the entire traveling plan while securing the precision of the first traveling plan in an arbitrary first section. It is also possible to reduce the amount of arithmetic processing compared to a case where the entire traveling plan is calculated with the same calculation granularity as the first traveling plan.

In the vehicle control device according to the invention, it is preferable that the traveling path division unit includes a section of the traveling path at a predetermined distance from the current position of the vehicle in the first section.

With this vehicle control device, it is possible to achieve reduction in the calculation time of the entire traveling plan while securing the precision of the traveling plan in a section at a predetermined distance from the destination of the vehicle. For this reason, after the calculation of the traveling plan ends, the next traveling plan is calculated while the vehicle is traveling in a section where the precision of the traveling plan is secured, such that the vehicle can continuously travel in a section where the precision of the traveling plan is secured. Therefore, with this vehicle control device, it becomes possible for the vehicle to continuously travel in a section where the precision of the traveling plan is secured and to reach the destination.

It is preferable that the vehicle control device according to the invention further includes a curved section setting unit which sets a section having a curvature equal to or greater than a predetermined value in the traveling path as a curved section, and the traveling path division unit includes the curved section in the first section.

With this vehicle control device, since the curved section in the traveling path where precise vehicle control is required compared to a linear section is included in the first section, it is possible to realize reliable vehicle control along the first traveling plan with the secured precision in the curved section. Therefore, with this vehicle control device, it is possible to achieve improvement in vehicle safety and ride quality in the curved section while achieving reduction in the calculation time of the entire traveling plan.

It is preferable that the vehicle control device according to the invention further includes a gradient-changing section setting unit which sets a section of the traveling path having a gradient change ratio equal to or greater than a predetermined value as a gradient-changing section, and the traveling path division unit includes the gradient-changing section in the first section.

With this vehicle control device, since the gradient-changing section in the traveling path where vehicle control largely affects mileage compared to a flat section is included in the first section, it is possible to realize reliable vehicle control along the first traveling plan with the secured precision in the gradient-changing section. Therefore, with this vehicle control device, it is possible to achieve improvement in vehicle safety and mileage in the gradient-changing section while achieving reduction in the calculation time of the entire traveling plan.

It is preferable that the vehicle control device according to the invention further includes an another-vehicle detection unit which detects another vehicle around the vehicle, and an another-vehicle approach point calculation unit which calculates an another-vehicle approach point where the margin time to collision between another vehicle detected by the another-vehicle detection unit and the vehicle is equal to or smaller than a predetermined value, and the traveling path division unit includes the another-vehicle approach point in the first section.

With this vehicle control device, since the another-vehicle approach point where the margin time to collision between another vehicle and the vehicle is equal to or smaller than a predetermined value is included in the first section, it is possible to realize reliable vehicle control along the first traveling plan with secured precision when another vehicle approaches. Therefore, with this vehicle control device, it is possible to achieve improvement in vehicle safety with respect to another vehicle while achieving reduction in the calculation time of the entire traveling plan.

In the vehicle control device according to the invention, it is preferable that the traveling plan calculation unit changes the calculation condition of the second traveling plan in accordance with a vehicle control policy set in advance.

In this vehicle control device, the calculation condition of the second traveling plan is changed in accordance with the vehicle control policy, such as safety-oriented, ride quality-oriented, or mileage-oriented set in advance by a driver or the like. Therefore, it is possible to achieve reduction in calculation time while preventing coarseness of calculation granularity of the second traveling plan from largely affecting the vehicle control policy.

DESCRIPTION OF EMBODIMENTS

Figure 1:
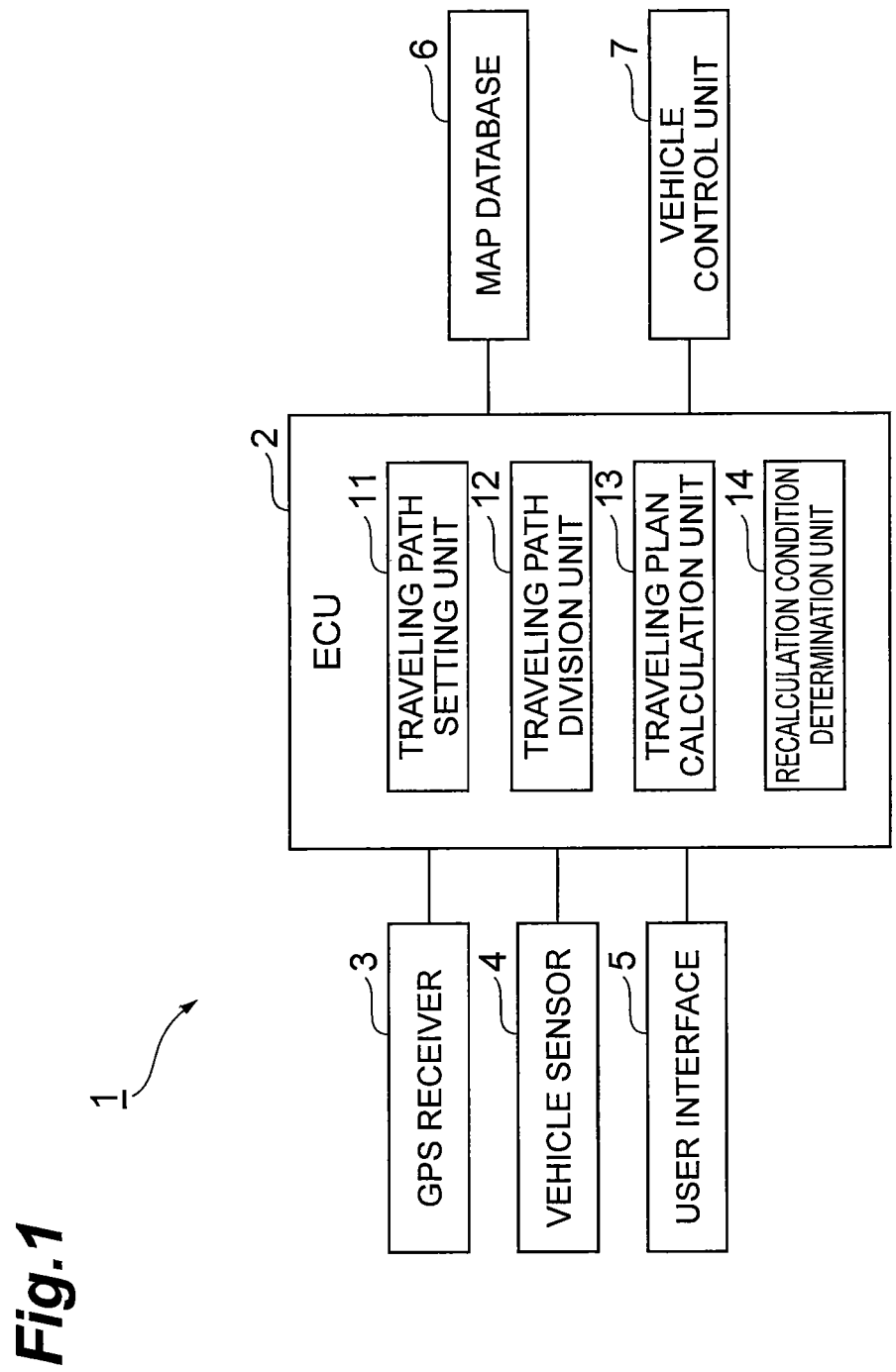
FIG. 1 is a block diagram showing a vehicle control device according to a first embodiment.

Hereinafter, preferred embodiments of a vehicle control device according to the invention will be described in detail with reference to the drawings. Note that the same portions are represented by the same reference numerals, and overlapping description will be omitted.

First Embodiment

A vehicle control device 1 according to a first embodiment calculates a traveling plan according to a traveling path from a current position of a vehicle to a destination, and controls the vehicle along the traveling plan. As shown in FIG. 1, the vehicle control device 1 includes an ECU [Electric Control Unit] 2 which performs overall control of the device.

The ECU 2 is an electronic control unit which has a CPU [Central Processing Unit] performing arithmetic processing, a ROM [Read Only Memory] and a RAM [Random Access Memory] serving as a storage unit, an input signal circuit, an output signal circuit, a power supply circuit, and the like. The ECU 2 is electrically connected to a GPS [Global Positioning System] receiver 3, a vehicle sensor 4, a user interface 5, a map database 6, and a vehicle control unit 7.

The GPS receiver 3 receives electric waves from a plurality of GPS satellites to detect a current position G of a vehicle. The GPS receiver 3 transmits the detected current position G to the ECU 2 as a current position signal.

The vehicle sensor 4 is a unit which detects an actual measurement value of the traveling state of the vehicle, such as the vehicle speed, acceleration, yaw rate, steering angle, and the like of the vehicle. Specifically, the vehicle sensor is constituted by various sensors including a vehicle speed sensor and an acceleration sensor, or the like. The vehicle sensor 4 transmits the detected actual measurement value of the traveling state of the vehicle to the ECU 2 as a vehicle actual measurement signal.

The user interface 5 is a unit which is used for input/output of information between the device and the driver. The user interface 5 is, for example, a touch panel-type display. The user interface 5 transmits information relating to the destination P of the vehicle input from the driver to the ECU 2 as a destination signal. The user interface 5 transfers various kinds of information including the traveling path of the vehicle and the like in response to a signal transmitted from the ECU 2 to the driver.

The map database 6 is a database which stores map information including road shape, gradient change, and the like. The map database 6 transmits map information to the ECU 2 in response to a map information request signal transmitted from the ECU 2. The vehicle control unit 7 controls the vehicle in response to a vehicle control signal transmitted from the ECU 2. The vehicle control unit 7 controls the engine, the steering actuator, the brake system, and the like of the vehicle, thereby realizing vehicle control.

The ECU 2 has a traveling path setting unit 11, a traveling path division unit 12, a traveling plan calculation unit 13, and a recalculation condition determination unit 14.

The traveling path setting unit 11 sets the traveling path from the current position G to the destination P. Specifically, when a destination signal is transmitted from the user interface 5, the traveling path setting unit 11 transmits a map information request signal to the map database 6 on the basis of a current position signal of the GPS receiver 3 so as to acquire map information around the vehicle. The traveling path setting unit 11 sets the traveling path from the current position G to the destination P on the basis of a map signal transmitted from the map database 6, the current position signal transmitted from the GPS receiver 3, and the destination signal transmitted from the user interface 5.

Figure 2:
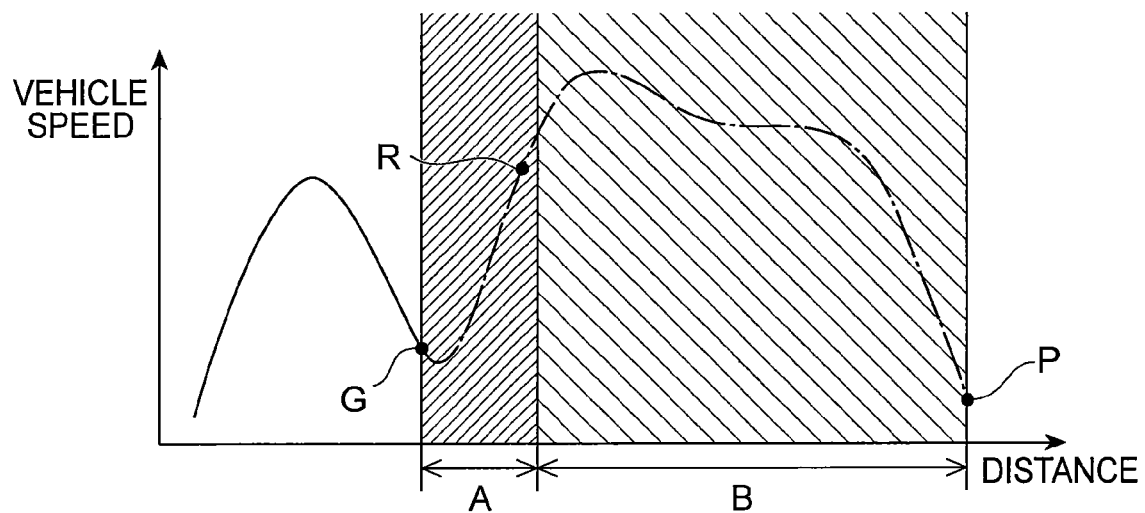
FIG. 2 is a graph showing the relationship between a traveling distance of a vehicle along a traveling path and a vehicle speed control target value in a traveling plan.
Figure 3:
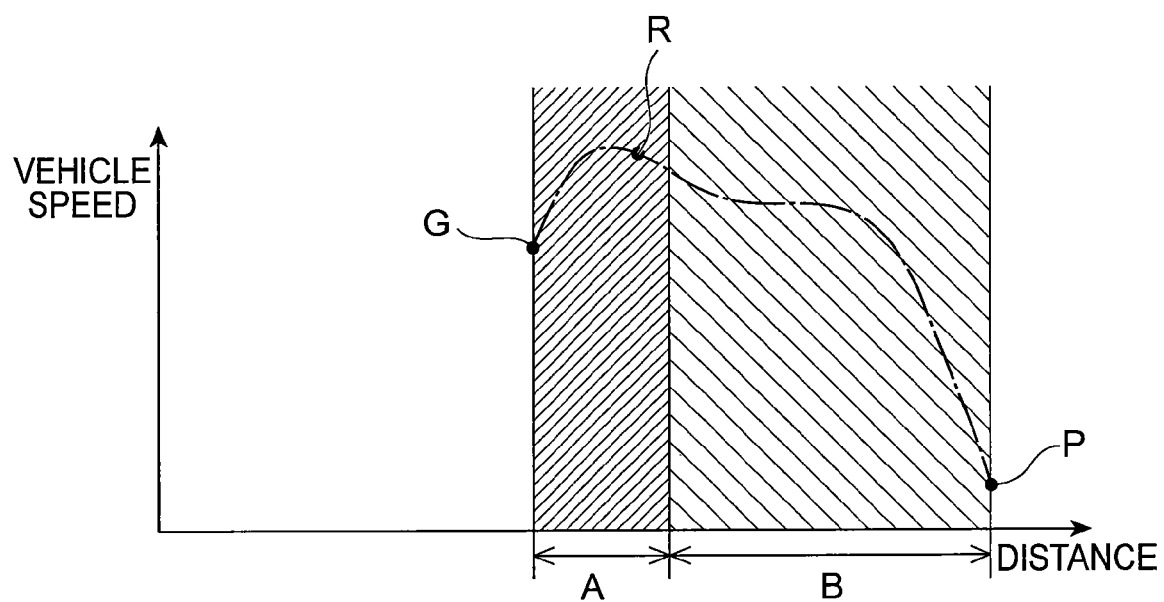
FIG. 3 is a graph showing division of a traveling path when a vehicle reaches a recalculation start point R shown in FIG. 2.

The traveling path division unit 12 divides the traveling path set by the traveling path setting unit 11 into a first section A and a second section B (see FIGS. 2 and 3). FIG. 2 is a graph showing the relationship between a traveling distance of a vehicle along a traveling path and a vehicle speed control target value in a traveling plan. FIG. 2 shows the current position G and the destination P of the vehicle. In FIG. 2, a solid line indicates the actual measurement value of the vehicle speed detected by the vehicle sensor 4, and a one-dot-chain line indicates the vehicle speed control target of the traveling plan. FIG. 3 is a graph when a vehicle reaches a recalculation start point R shown in FIG. 2. The recalculation start point R will be described below. As shown in FIGS. 2 and 3, the traveling path division unit 12 divides the traveling path into the first section A which is a section at a predetermined distance from the current position of the vehicle and the second section B which is a section other than the first section A in the traveling path.

The traveling plan calculation unit 13 calculates a traveling plan of the vehicle in accordance with the traveling path. In the traveling plan, vehicle control target values relating to the vehicle traveling state (vehicle speed, acceleration, steering angle, yaw rate, vehicle position, and the like) at each predetermined time for vehicle traveling along the traveling path are determined in advance. In other words, the traveling plan is constituted by a time-series data group of various vehicle control target values.

The traveling plan calculation unit 13 calculates a first traveling plan according to the first section A and a second traveling plan according to the second section B in the traveling path. When calculating the first and second traveling plans, the traveling plan calculation unit 13 uses convergence calculation, such as a SCGRA [Sequential Conjugate Gradient Restoration Algorithm] method, or various calculation models (vehicle model, jerk calculation model, friction circle calculation model, and the like).

The traveling plan calculation unit 13 coarsens calculation granularity in the second traveling plan compared to calculation granularity in the first traveling plan. The calculation granularity is the level of calculation processing. Three factors which mainly affect coarseness of calculation granularity will be described. The first factor is the time interval of the time-series data group which constitutes the traveling plan. As the interval on the time axis of the time-series data group constituting the traveling plan is large, the calculation granularity is coarsened. The second factor is the end condition (convergence condition) in the convergence calculation. As the end condition is loose, the calculation granularity is coarsened. The third factor is various calculation models which are used to calculate the traveling plan. As simplified models are used as the calculation models, the calculation granularity is coarsened. In this way, as the calculation granularity is coarsened by the effect of the three factors, the calculation processing of the traveling plan is simplified. As the calculation processing is simplified, while the precision of the traveling plan is degraded, the calculation time is reduced. Accordingly, in regard to the second traveling plan whose calculation granularity is coarse, while the precision is degraded, the calculation time is reduced compared to the first traveling plan.

The traveling plan calculation unit 13 sets the recalculation start point R in the first section A. The recalculation start point R is the point the vehicle reaches so as to start recalculation of the travel plan (see FIGS. 2 and 3). Specifically, the traveling plan calculation unit 13 recognizes a first recognized time until the vehicle passes through the first section A on the basis of the first traveling plan. Subsequently, the traveling plan calculation unit 13 calculates a second calculated time by excluding a first calculated time spent to calculate the first and second traveling plans in this time from the first recognized time. The traveling plan calculation unit 13 sets, as the recalculation start point R, a point in the first traveling plan where the vehicle is positioned after the second calculated time. The traveling plan calculation unit 13 transmits a vehicle control signal according to the calculated first and second traveling plans to the vehicle control unit 7.

The traveling plan calculation unit 13 determines whether or not the vehicle reaches the destination P on the basis of the current position signal transmitted from the GPS receiver 3. When it is determined that the vehicle has reached the destination P, the traveling plan calculation unit 13 ends vehicle control processing.

Figure 4:
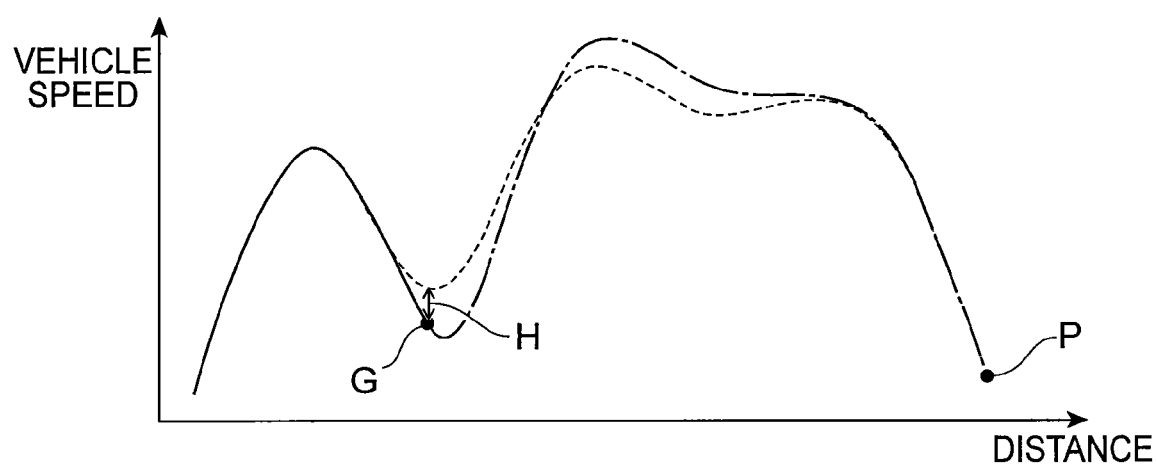
FIG. 4 is a graph illustrating a case where a difference occurs between an actual measurement value of vehicle speed and a vehicle speed control target value.

The recalculation condition determination unit 14 determines whether or not the recalculation condition for recalculating a traveling plan is satisfied. Specifically, the recalculation condition determination unit 14 recognizes the actual measurement value of the traveling state of the vehicle, such as the vehicle speed, acceleration, steering angle, yaw rate, or the like of the vehicle, on the basis of the vehicle actual measurement signal transmitted from the vehicle sensor 4. The recalculation condition determination unit 14 determines whether or not the difference between the recognized actual measurement value of the traveling state of the vehicle and the vehicle control target value of the first traveling plan is within a predetermined allowable range. FIG. 4 is a graph showing a case where a difference occurs between an actual measurement value of a vehicle and a vehicle speed control target value. In FIG. 4, a broken line indicates the vehicle speed control target of the traveling plan calculated before the vehicle starts to travel. A one-dot-chain line indicates the vehicle speed control target of the traveling plan recalculated at the current position G. A solid line indicates the actual measurement value of the vehicle speed detected by the vehicle sensor 4. In FIG. 4, the difference between the actual measurement value (solid line) of the vehicle speed at the current position G and the vehicle speed control target value (broken line) of the traveling plan calculated before traveling is indicated by H. When it is determined that the difference between the actual measurement value of the vehicle and the vehicle control target value of the first traveling plan is not within an allowable range, the recalculation condition determination unit 14 determines that the recalculation condition is satisfied.

The recalculation condition determination unit 14 determines whether or not the vehicle reaches the recalculation start point R set by the traveling plan calculation unit 13 on the basis of the current position signal transmitted from the GPS receiver 3 (see FIGS. 2 and 3). When it is determined that the vehicle has reached the recalculation start point R, the recalculation condition determination unit 14 determines that the recalculation condition is satisfied. If the recalculation condition determination unit 14 determines that the recalculation condition is satisfied, the division of the traveling path in the traveling path division unit 12 and the calculation of the traveling path in the traveling plan calculation unit 13 are performed again.

Next, processing which is performed by the ECU 2 of the vehicle control device 1 according to the first embodiment described above will be described with reference to the drawings.

Figure 5:
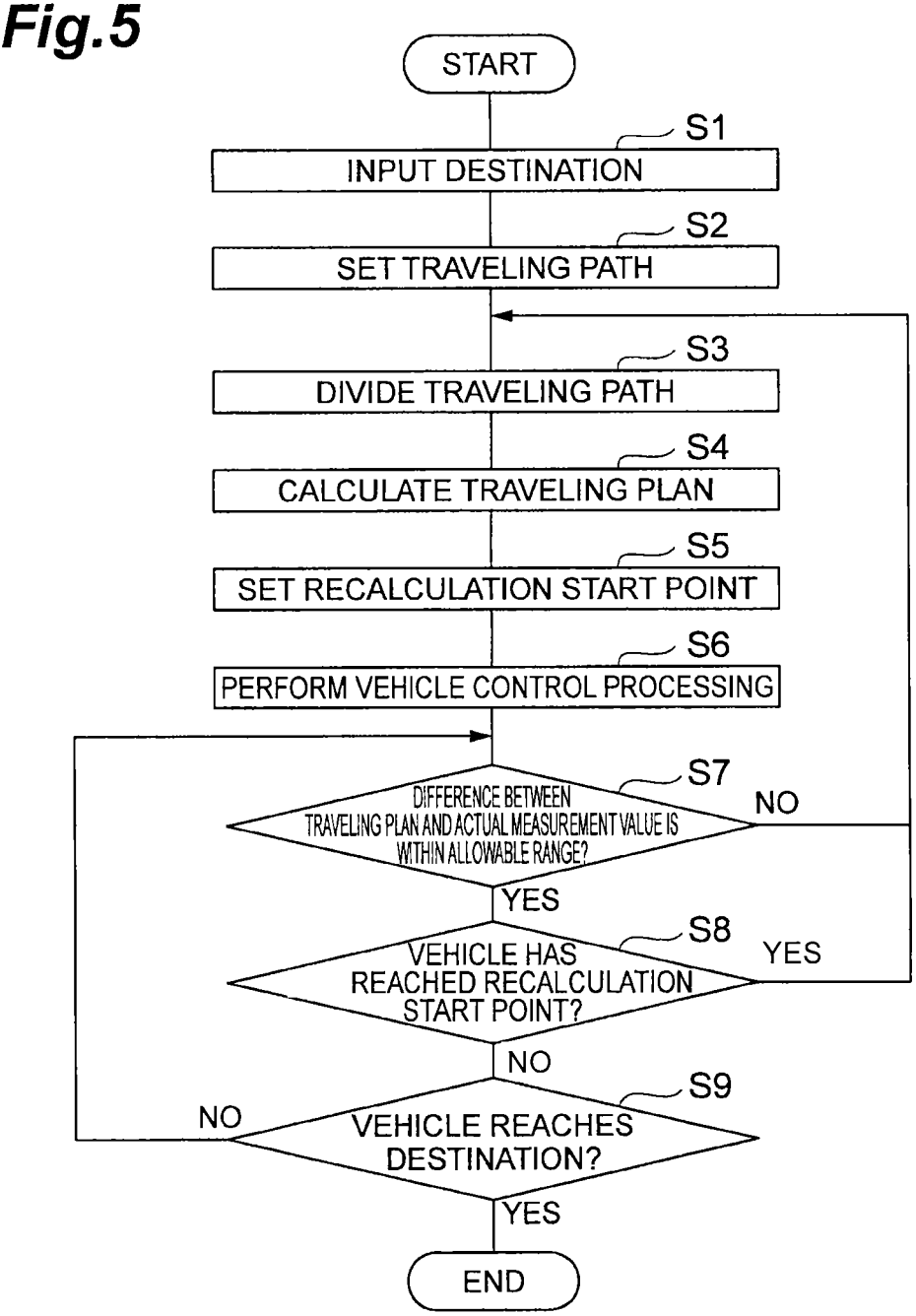
FIG. 5 is a flowchart showing the operation of the vehicle control device according to the first embodiment.

As shown in FIG. 5, the traveling path setting unit 11 of the ECU 2 first recognizes the input of the destination P from the driver on the basis of the destination signal transmitted from the user interface 5 (S1). Next, the traveling path setting unit 11 sets the traveling path from the current position G of the vehicle to the destination P on the basis of the destination signal transmitted from the user interface 5, the current position signal transmitted from the GPS receiver 3, and the map signal transmitted from the map database 6 (S2).

Thereafter, the traveling path division unit 12 of the ECU 2 divides the traveling path set by the traveling path setting unit 11 into the first section A at a predetermined distance from the current position G of the vehicle and the second section B which is a section other than the first section A in the traveling path (S3). The traveling plan calculation unit 13 of the ECU 2 calculates the first traveling plan according to the first section A and the second traveling plan according to the second section B in the traveling path (S4). At this time, the traveling plan calculation unit 13 coarsens calculation granularity in the second traveling plan compared to calculation granularity in the first traveling plan.

Next, the traveling plan calculation unit 13 sets the recalculation start point R in the first section A (S5). Subsequently, the traveling plan calculation unit 13 starts to transmit a vehicle control signal according to the calculated first and second traveling plans to the vehicle control unit 7 (S6). The vehicle control unit 7 drives the engine, the steering actuator, the brake system, and the like of the vehicle in accordance with the vehicle control signal transmitted from the traveling plan calculation unit 13, thereby performing vehicle control.

If the traveling plan calculation unit 13 transmits the vehicle control signal, the recalculation condition determination unit 14 of the ECU 2 recognizes the actual measurement value of the traveling state of the vehicle on the basis of the vehicle actual measurement signal transmitted from the vehicle sensor 4. The recalculation condition determination unit 14 determines whether or not the difference between the recognized actual measurement value of the traveling state of the vehicle and the vehicle control target value of the first traveling plan is within the allowable range (S7). When it is determined that the difference between the actual measurement value and the vehicle control target value of the first traveling plan is not within the allowable range, the recalculation condition determination unit 14 determines that the recalculation condition is satisfied, and returns to S3 again.

When it is determined that the difference between the actual measurement value and the vehicle control target value of the first traveling plan is within the allowable range, the recalculation condition determination unit 14 determines whether or not the vehicle reaches the recalculation start point R set by the traveling plan calculation unit 13 on the basis of the current position signal transmitted from the GPS receiver 3 (S8). When it is determined that the vehicle has reached the recalculation start point R, the recalculation condition determination unit 14 determines that the recalculation condition is satisfied, and returns to S3 again. When the recalculation condition determination unit 14 determines that the vehicle has not reached the recalculation start point R, the traveling plan calculation unit 13 determines whether or not the vehicle reaches the destination P on the basis of the current position signal transmitted from the GPS receiver 3 (S9). When it is determined that the vehicle has not reached the destination P, the traveling plan calculation unit 13 returns to S7 again. When it is determined that the vehicle has reached the destination P, the traveling plan calculation unit 13 ends the vehicle control processing.

According to the vehicle control device 1 of the first embodiment described above, the first traveling plan and the second traveling plan in which calculation granularity is coarse and calculation processing is simple compared to the first traveling plan are calculated as the traveling plan, thereby reducing the calculation time in exchange for degradation in the precision of the traveling plan compared to a case where the entire traveling plan is calculated with the same calculation granularity as the first traveling plan. Therefore, according to this vehicle control device 1, it is possible to achieve reduction in the calculation time of the entire traveling plan while securing the precision of the first traveling plan in the first section A.

According to this vehicle control device 1, it is possible to reduce the amount of arithmetic processing compared to a case where the entire traveling plan is calculated with the same calculation granularity as the first traveling plan. A form may be made in which the length of the first section A dynamically changes in accordance with a request from the driver or under various conditions, such as ambient environment, making it possible to adjust the balance of the precision and calculation time of the traveling plan.

In this vehicle control device 1, the first section A is the section at a predetermined distance from the current position G of the vehicle. The recalculation start point R where the recalculation of the traveling plan starts is set in the first section A, such that, while the vehicle is controlled along the first traveling plan in the first section A, the first traveling plan is calculated with a section at a predetermined distance from the current position G as a new first section A, making it possible for the vehicle to continuously travel in a section with secured precision of the traveling plan. Therefore, according to this vehicle control device 1, the vehicle can continuously travel in a section with secured precision of the traveling plan and reach the destination P, thereby performing reliable vehicle control.

Second Embodiment

Next, a vehicle control device 21 according to a second embodiment will be described with reference to the drawings. The vehicle control device 21 according to the second embodiment is primarily different from the vehicle control device 1 according to the first embodiment in that the traveling path is divided taking into consideration a curved section C.

Figure 6:
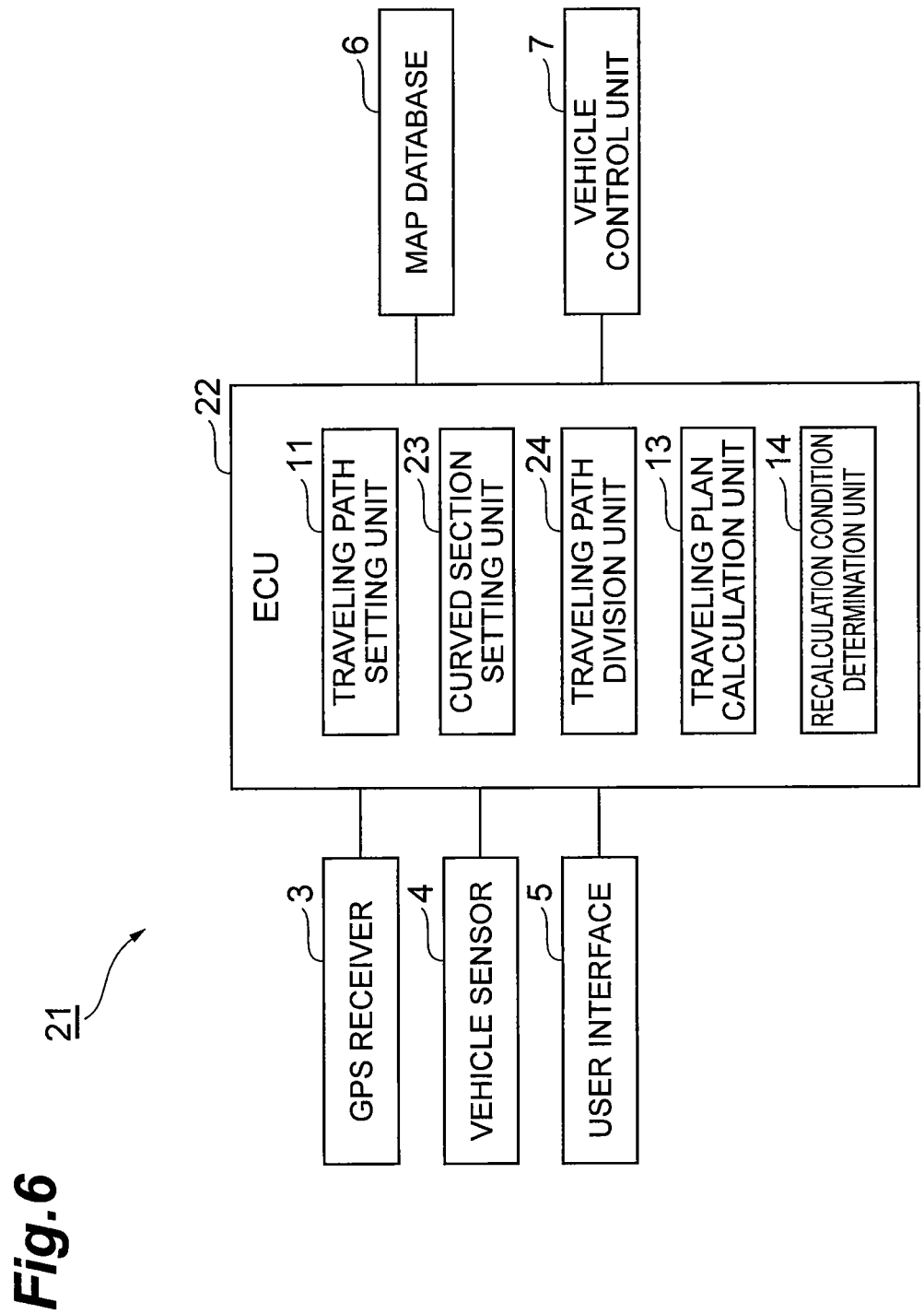
FIG. 6 is a block diagram showing a vehicle control device according to a second embodiment.
Figure 7:
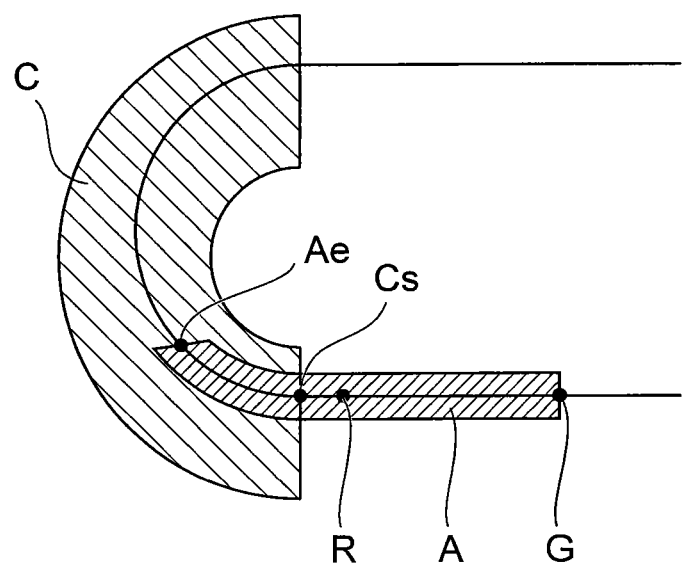
FIG. 7 is a schematic plan view showing a curved section.

As shown in FIGS. 6 and 7, an ECU 22 of the vehicle control device 21 according to the second embodiment further has a curved section setting unit 23 compared to the ECU 2 according to the first embodiment. The curved section setting unit 23 sets a section having a curvature equal to or greater than a predetermined value in the traveling path set by the traveling path setting unit 11 as a curved section C.

A traveling path division unit 24 of the ECU 22 divides the traveling path into a first section A at a predetermined distance from the current position G of the vehicle and a second section B which is a section other than the first section A in the traveling path. The traveling path division unit 24 determines whether or not an end point Ae of the first section A is included in the curved section C. When it is determined that the end point Ae of the first section A is included in the curved section C, the traveling path division unit 24 reduces the first section A such that the end point of the first section A becomes a start point Cs of the curved section C. When the first section A is reduced, the traveling path division unit 24 performs setting processing such that the entire curved section C is included in the first section A through the next traveling path division (that is, through traveling path division after the recalculation condition is satisfied). In this case, the traveling path division unit 24 expands the first section A so as to include the curved section C at the time of the next traveling path division. When the entire curved section C is at a predetermined distance from the current position G of the vehicle, the first section A is not expanded.

Next, processing which is performed by the ECU 22 of the vehicle control device 21 according to the second embodiment described above will be described with reference to the drawings.

Figure 8:
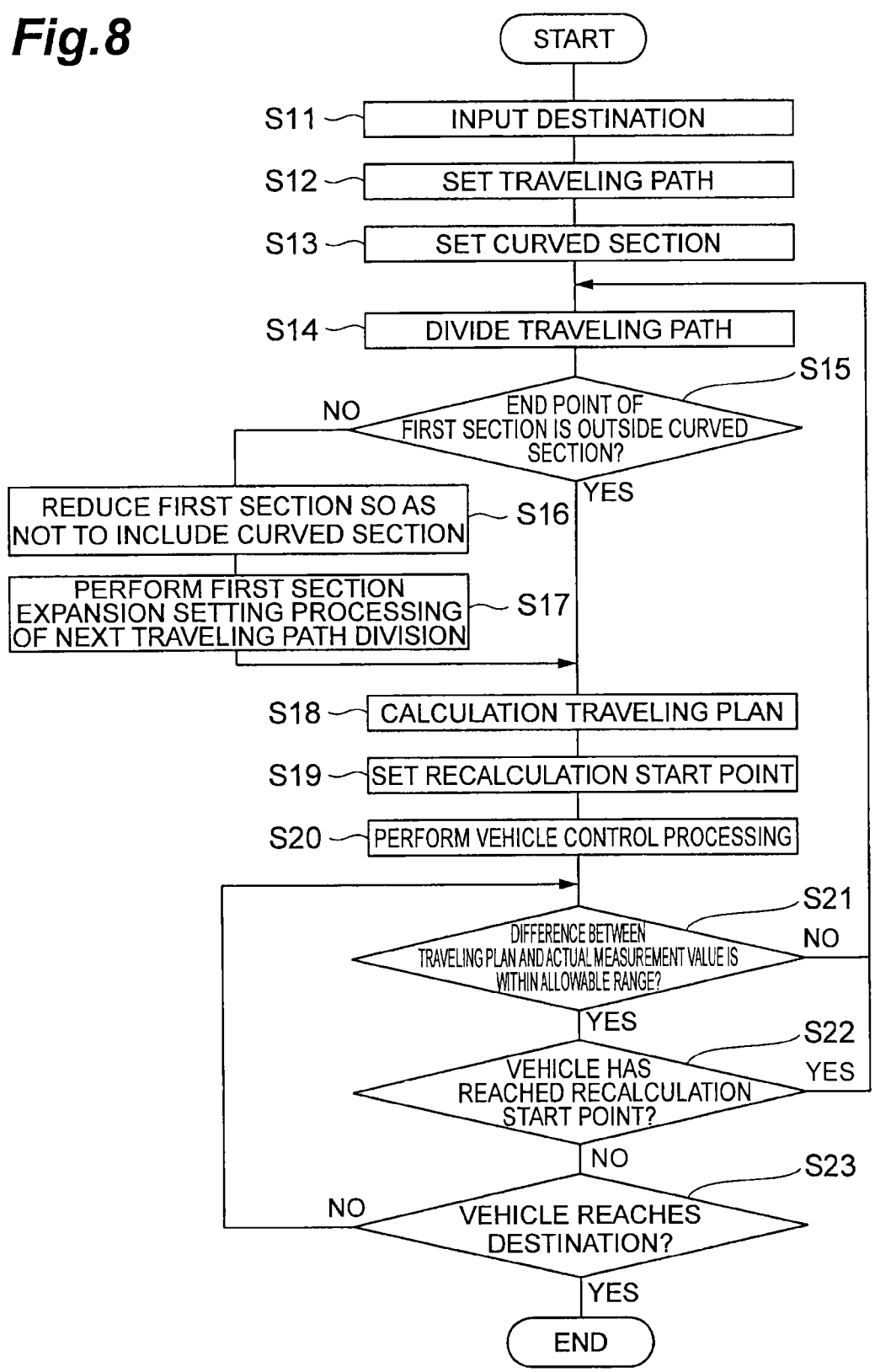
FIG. 8 is a flowchart showing the operation of the vehicle control device according to the second embodiment.

As shown in FIG. 8, the traveling path setting unit 11 of the ECU 22 first recognizes the input of the destination P from the driver on the basis of the destination signal transmitted from the user interface 5 (S11). Next, the traveling path setting unit 11 sets the traveling path from the current position G of the vehicle to the destination P on the basis of the current position signal transmitted from the GPS receiver 3, the destination signal transmitted from the user interface 5, and the map signal transmitted from the map database 6 (S12).

If the traveling path setting unit 11 sets the traveling path, the curved section setting unit 23 sets a section having a curvature equal to or greater than a predetermined value in the traveling path as the curved section C (S13). Thereafter, the traveling path division unit 24 divides the traveling path set by the traveling path setting unit 11 into the first section A at a predetermined distance from the current position G of the vehicle and the second section B which is the section other than the first section A in the traveling path (S14).

Subsequently, the traveling path division unit 24 determines whether or not the end point Ae of the first section A is included in the curved section C (S15). When it is determined that the end point Ae of the first section A is not included in the curved section C, the traveling path division unit 24 progresses to S18. When it is determined that the end point Ae of the first section A is included in the curved section C, the traveling path division unit 24 reduces the first section A such that the end point of the first section A becomes the start point Cs of the curved section C (S16). When the first section A is reduced, the traveling path division unit 24 performs first section expansion setting processing for setting such that the entire curved section C is included in the first section A through the next traveling path division (S17). Thereafter, the process progresses to S18.

In S18, the traveling plan calculation unit 13 calculates the first traveling plan according to the first section A and the second traveling plan according to the second section B in the traveling path. At this time, the traveling plan calculation unit 13 coarsens calculation granularity in the second traveling plan compared to calculation granularity in the first traveling plan.

Next, the traveling plan calculation unit 13 sets the recalculation start point R in the first section A (S19). Subsequently, the traveling plan calculation unit 13 starts to transmit the vehicle control signal according to the calculated first and second traveling plans to the vehicle control unit 7 (S20). The vehicle control unit 7 drives the engine, the steering actuator, the brake system, and the like of the vehicle in accordance with the vehicle control signal transmitted from the traveling plan calculation unit 13, thereby performing vehicle control.

If the traveling plan calculation unit 13 transmits the vehicle control signal, the recalculation condition determination unit 14 of the ECU 2 determines whether or not the difference between the actual measurement value of the traveling state of the vehicle and the vehicle control target value of the first traveling plan is within the allowable range on the basis of the vehicle actual measurement signal transmitted from the vehicle sensor 4 (S21). When it is determined that the difference between the actual measurement value and the vehicle control target value of the first traveling plan is not within the allowable range, the recalculation condition determination unit 14 determines that the recalculation condition is satisfied, and returns to S14 again.

When it is determined that the difference between the actual measurement value and the vehicle control target value of the first traveling plan is within the allowable range, the recalculation condition determination unit 14 determines whether or not the vehicle reaches the recalculation start point R set by the traveling plan calculation unit 13 on the basis of the current position signal transmitted from the GPS receiver 3 (S22). When it is determined that the vehicle has reached the recalculation start point R, the recalculation condition determination unit 14 determines that the recalculation condition is satisfied, and returns to S14 again. When the recalculation condition determination unit 14 determines that the vehicle has not reached the recalculation start point R, the traveling plan calculation unit 13 determines whether or not the vehicle reaches the destination P on the basis of the current position signal transmitted from the GPS receiver 3 (S23). When it is determined that the vehicle has not reached the destination P, the traveling plan calculation unit 13 returns to S21 again. When it is determined that the vehicle has reached the destination P, the traveling plan calculation unit 13 ends the vehicle control processing.

According to the vehicle control device 21 of the second embodiment described above, it is possible to obtain the same effects as the vehicle control device 1 of the first embodiment. Since the curved section C in the traveling path where precise vehicle control is required compared to a linear section is included in the first section A, it is possible to realize reliable vehicle control along the first traveling plan with the secured precision. Therefore, according to this vehicle control device 21, it is possible to achieve improvement in vehicle safety and ride quality in the curved section C while achieving reduction in the calculation time of the entire traveling plan.

Third Embodiment

Next, a vehicle control device 31 according to a third embodiment will be described with reference to the drawings. The vehicle control device 31 according to the third embodiment is different from the vehicle control device 1 according to the first embodiment in that the traveling path is divided taking into consideration a gradient-changing section D.

Figure 9:
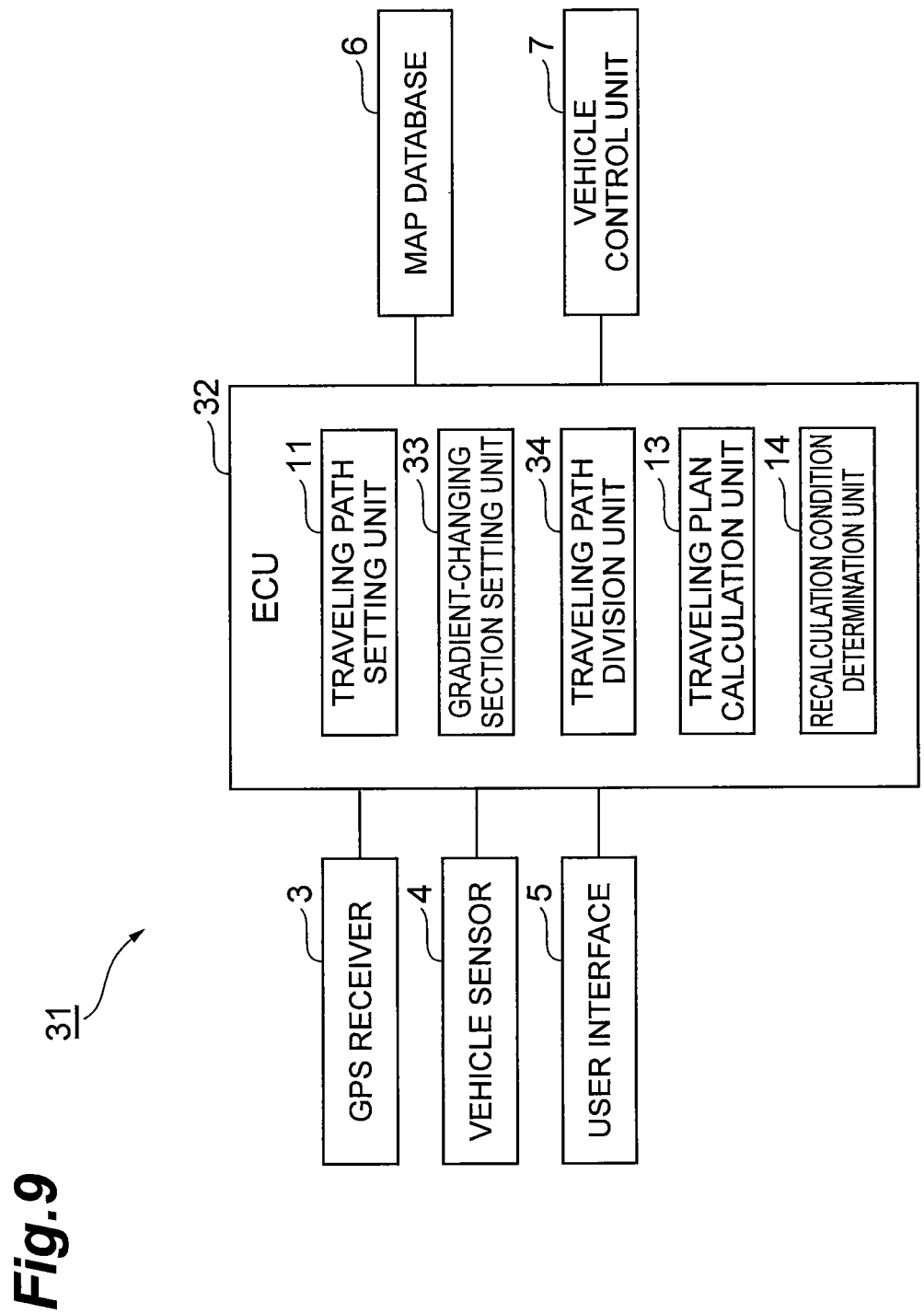
FIG. 9 is a block diagram showing a vehicle control device according to a third embodiment.
Figure 10:
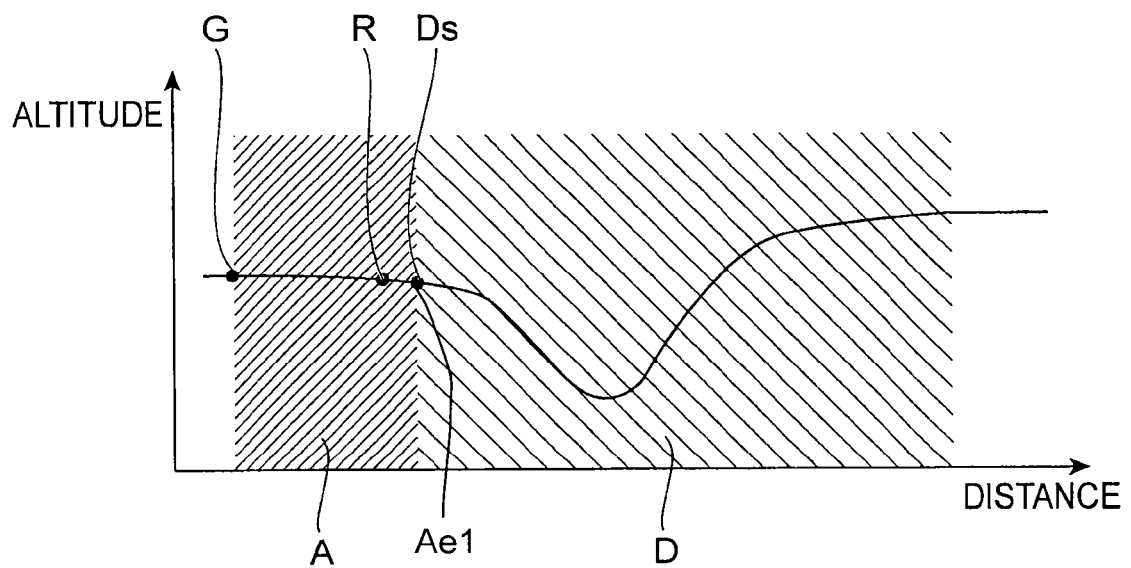
FIG. 10 is a schematic side view showing a gradient-changing section.

As shown in FIGS. 9 and 10, an ECU 32 of the vehicle control device 31 according to the third embodiment further has a gradient-changing section setting unit 33 compared to the ECU 2 according to the first embodiment. The gradient-changing section setting unit 33 sets a section having a gradient change equal to or greater than a predetermined value in the traveling path set by the traveling path setting unit 11 as a gradient-changing section D.

A traveling path division unit 34 of the ECU 32 divides the traveling path into a first section A which is a section at a predetermined distance from the current position G of the vehicle and a second section B which is a section other than the first section A in the traveling path. The traveling path division unit 34 determines whether or not an end point Ae1 of the first section A is included in the gradient-changing section D. When it is determined that the end point Ae1 of the first section A is included in the gradient-changing section D, the traveling path division unit 34 reduces the first section A such that the end point of the first section A becomes a start point Ds of the gradient-changing section D. When the first section A is reduced, the traveling path division unit 34 performs setting processing such that the entire gradient-changing section D is included in the first section A through the next traveling path division (that is, through traveling path division after the recalculation condition is satisfied). In this case, the traveling path division unit 34 expands the first section A so as to include the entire gradient-changing section D through the next traveling path division. When the entire gradient-changing section D is at a predetermined distance from the current position G of the vehicle, the first section A is not expanded.

Next, processing which is performed by the ECU 32 of the vehicle control device 31 according to the third embodiment described above will be described with reference to the drawings.

Figure 11:
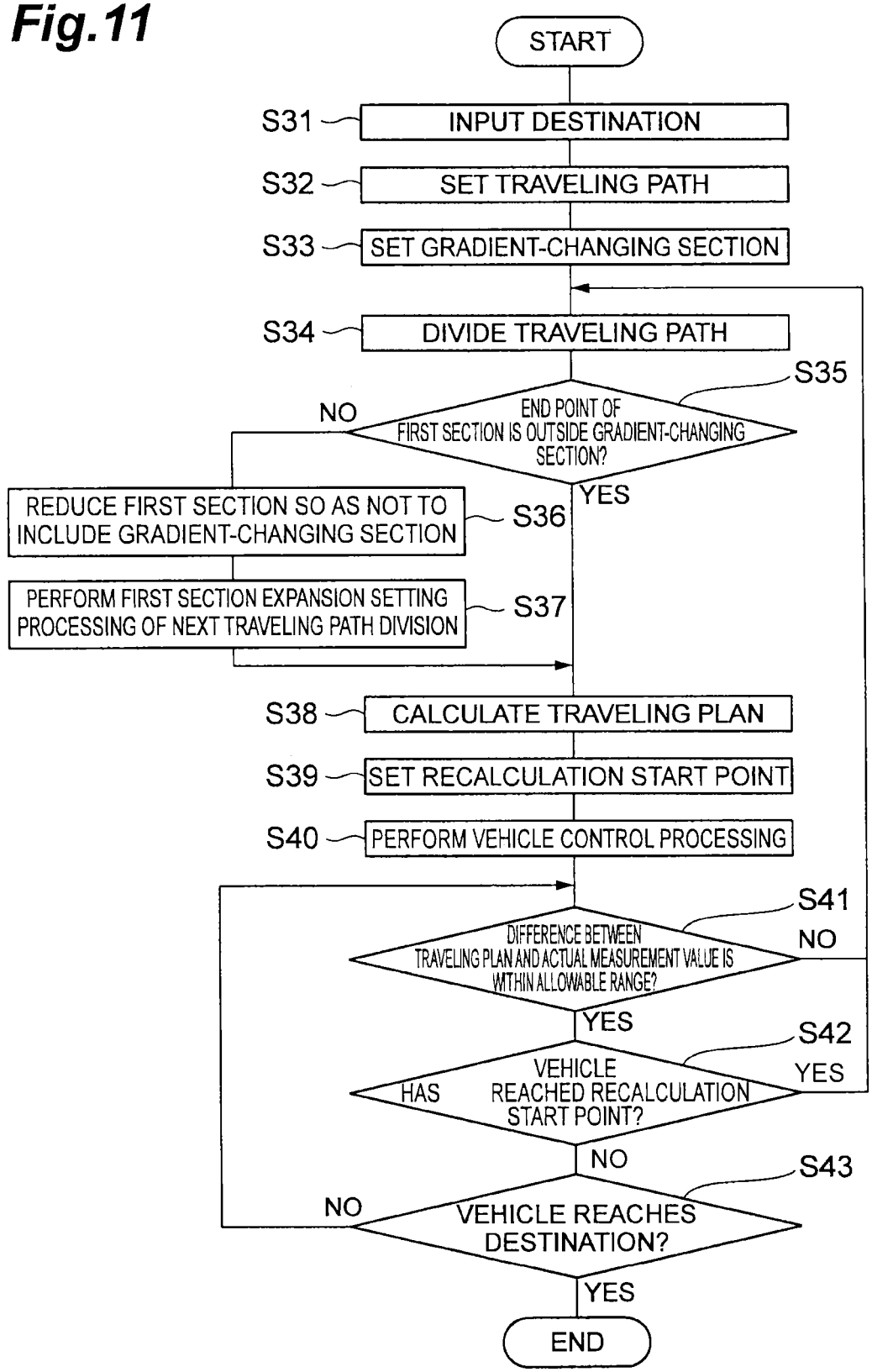
FIG. 11 is a flowchart showing the operation of the vehicle control device according to the third embodiment.

As shown in FIG. 11, the traveling path setting unit 11 of the ECU 32 first recognizes the input of the destination P from the driver on the basis of the destination signal transmitted from the user interface 5 (S31). Next, the traveling path setting unit 11 sets the traveling path from the current position G of the vehicle to the destination P on the basis of the current position signal transmitted from the GPS receiver 3, the destination signal transmitted from the user interface 5, and the map signal transmitted from the map database 6 (S32).

If the traveling path setting unit 11 sets the traveling path, the gradient-changing section setting unit 33 sets a section having a gradient change equal to or greater than a predetermined value in the traveling path as the gradient-changing section D (S33). Thereafter, the traveling path division unit 34 divides the traveling path set by the traveling path setting unit 11 into the first section A at a predetermined distance from the current position G of the vehicle and the second section B which is the section other than the first section A in the traveling path (S34).

Subsequently, the traveling path division unit 34 determines whether or not the end point Ae of the first section A is included in the gradient-changing section D (S35). When it is determined that the end point Ae1 of the first section A is not included in the gradient-changing section D, the traveling path division unit 34 progresses to S38. When it is determined that the end point Ae1 of the first section A is included in the gradient-changing section D, the traveling path division unit 34 reduces the first section A such that the end point of the first section A becomes the start point Ds of the gradient-changing section D (S36). When the first section A is reduced, the traveling path division unit 34 performs first section expansion setting processing for setting such that the entire gradient-changing section D is included in the first section A through the next traveling path division (S37). Thereafter, the process progresses to S38.

In S38, the traveling plan calculation unit 13 calculates the first traveling plan according to the first section A and the second traveling plan according to the second section B in the traveling path. At this time, the traveling plan calculation unit 13 coarsens calculation granularity in the second traveling plan compared to calculation granularity in the first traveling plan.

Next, the traveling plan calculation unit 13 sets the recalculation start point R in the first section A (S39). Subsequently, the traveling plan calculation unit 13 starts to transmit the vehicle control signal according to the calculated first and second traveling plans to the vehicle control unit 7 (S40). The vehicle control unit 7 drives the engine, the steering actuator, the brake system, and the like of the vehicle in accordance with the vehicle control signal transmitted from the traveling plan calculation unit 13, thereby performing vehicle control.

If the traveling plan calculation unit 13 transmits the vehicle control signal, the recalculation condition determination unit 14 of the ECU 32 determines whether or not the difference between the actual measurement value of the traveling state of the vehicle and the vehicle control target value of the first traveling plan is within the allowable range on the basis of the vehicle actual measurement signal transmitted from the vehicle sensor 4 (S41). When it is determined that the difference between the actual measurement value and the vehicle control target value of the first traveling plan is not within the allowable range, the recalculation condition determination unit 14 determines that the recalculation condition is satisfied, and returns to S34 again.

When it is determined that the difference between the actual measurement value and the vehicle control target value of the first traveling plan is within the allowable range, the recalculation condition determination unit 14 determines whether or not the vehicle reaches the recalculation start point R set by the traveling plan calculation unit 13 on the basis of the current position signal transmitted from the GPS receiver 3 (S42). When it is determined that the vehicle has reached the recalculation start point R, the recalculation condition determination unit 14 determines that the recalculation condition is satisfied, and returns to S34 again. When the recalculation condition determination unit 14 determines that the vehicle has not reached the recalculation start point R, the traveling plan calculation unit 13 determines whether or not the vehicle reaches the destination P on the basis of the current position signal transmitted from the GPS receiver 3 (S43). When it is determined that the vehicle has not reached the destination P, the traveling plan calculation unit 13 returns to S41 again. When it is determined that the vehicle has reached the destination P, the traveling plan calculation unit 13 ends the vehicle control processing.

According to the vehicle control device 31 of the third embodiment described above, it is possible to obtain the same effects as the vehicle control device 1 of the first embodiment. Since the gradient-changing section D in the traveling path where vehicle control largely affects mileage compared to a flat section is included in the first section A, it is possible to realize reliable vehicle control along the first traveling plan with the secured precision in the gradient-changing section D. Therefore, according to this vehicle control device 31, it is possible to achieve improvement in vehicle safety and mileage while achieving reduction in the calculation time of the entire traveling plan.

Fourth Embodiment

Next, a vehicle control device 41 according to a fourth embodiment will be described with reference to the drawings. The vehicle control device 41 according to the fourth embodiment is different from the vehicle control device 1 according to the first embodiment in that the traveling path is divided taking into consideration the approach of another vehicle.

Figure 12:
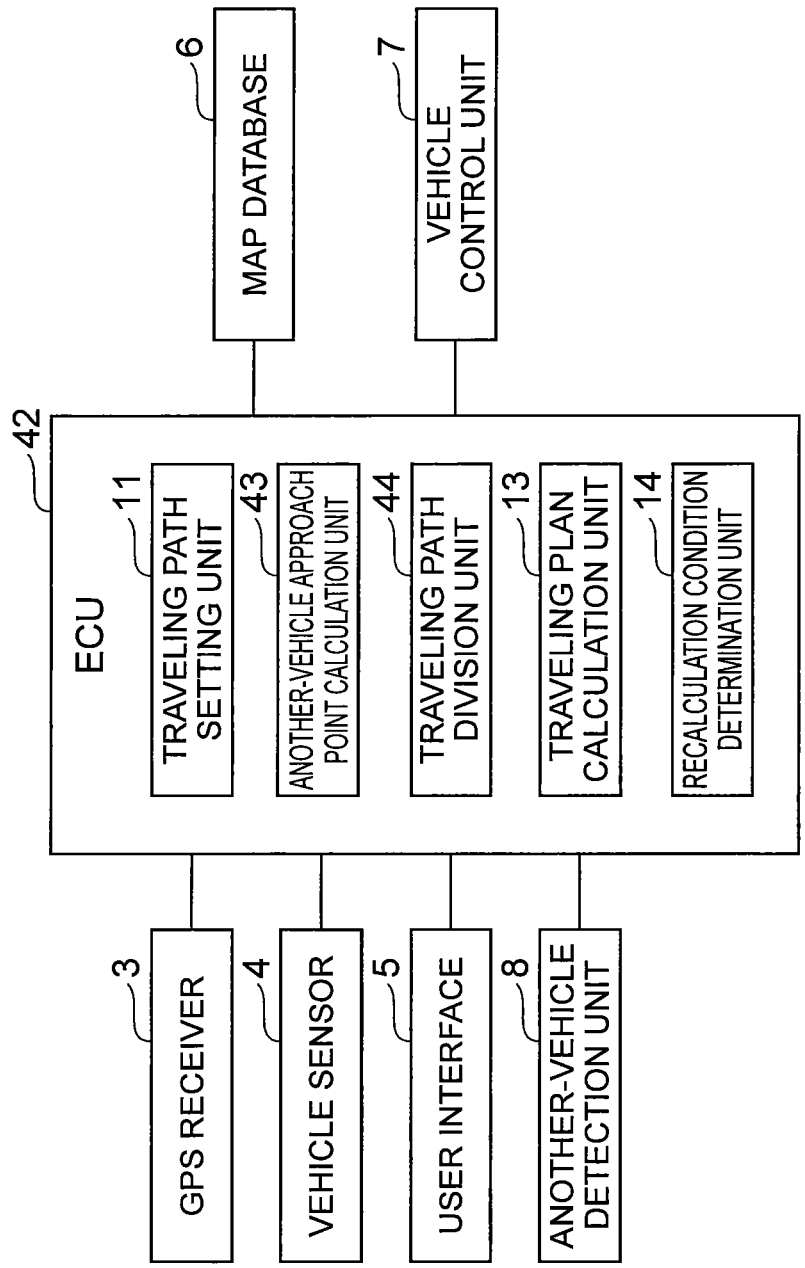
FIG. 12 is a block diagram showing a vehicle control device according to a fourth embodiment.

As shown in FIG. 12, the vehicle control device 41 according to the fourth embodiment further includes an another-vehicle detection unit 8 compared to the ECU 2 according to the first embodiment. An ECU 42 of the vehicle control device 41 further has an another-vehicle approach point setting unit 43.

An another-vehicle detection unit 8 detects another vehicle around the vehicle. The another-vehicle detection unit 8 has, for example, a millimeter-wave radar sensor, a laser radar sensor, an image sensor, or the like. The another-vehicle detection unit 8 transmits the acquired information relating to another vehicle to the ECU 42 as an another-vehicle signal. The another-vehicle approach point setting unit 43 of the ECU 42 calculates the margin time to collision TTC [Time To Collision] of the vehicle against another vehicle on the basis of the vehicle actual measurement signal transmitted from the vehicle sensor 4 and the another-vehicle signal transmitted from the another-vehicle detection unit 8. The another-vehicle approach point setting unit 43 sets, as an another-vehicle approach point, a point on the traveling path where the margin time to collision TTC is equal to or smaller than a predetermined value. The another-vehicle approach point setting unit 43 sets an another-vehicle approach point for each of other vehicles detected by the another-vehicle detection unit 8.

The traveling path division unit 44 of the ECU 42 divides the traveling path into a first section A which is a section at a predetermined distance from the current position G of the vehicle and a second section B which is a section other than the first section A in the traveling path. The traveling path division unit 44 determines whether or not the another-vehicle approach point setting unit 43 sets an another-vehicle approach point. When it is determined that the another-vehicle approach point setting unit 43 sets an another-vehicle approach point, the traveling path division unit 44 determines whether or not all another-vehicle approach points are in the first section A. When it is determined that all another-vehicle approach points are not in the first section A, the traveling path division unit 44 expands the first section A so as to include all another-vehicle approach points. There may be a limit to the expansion of the first section A.

Next, processing which is performed by the ECU 42 of the vehicle control device 41 according to the fourth embodiment described above will be described with reference to the drawings.

Figure 13:
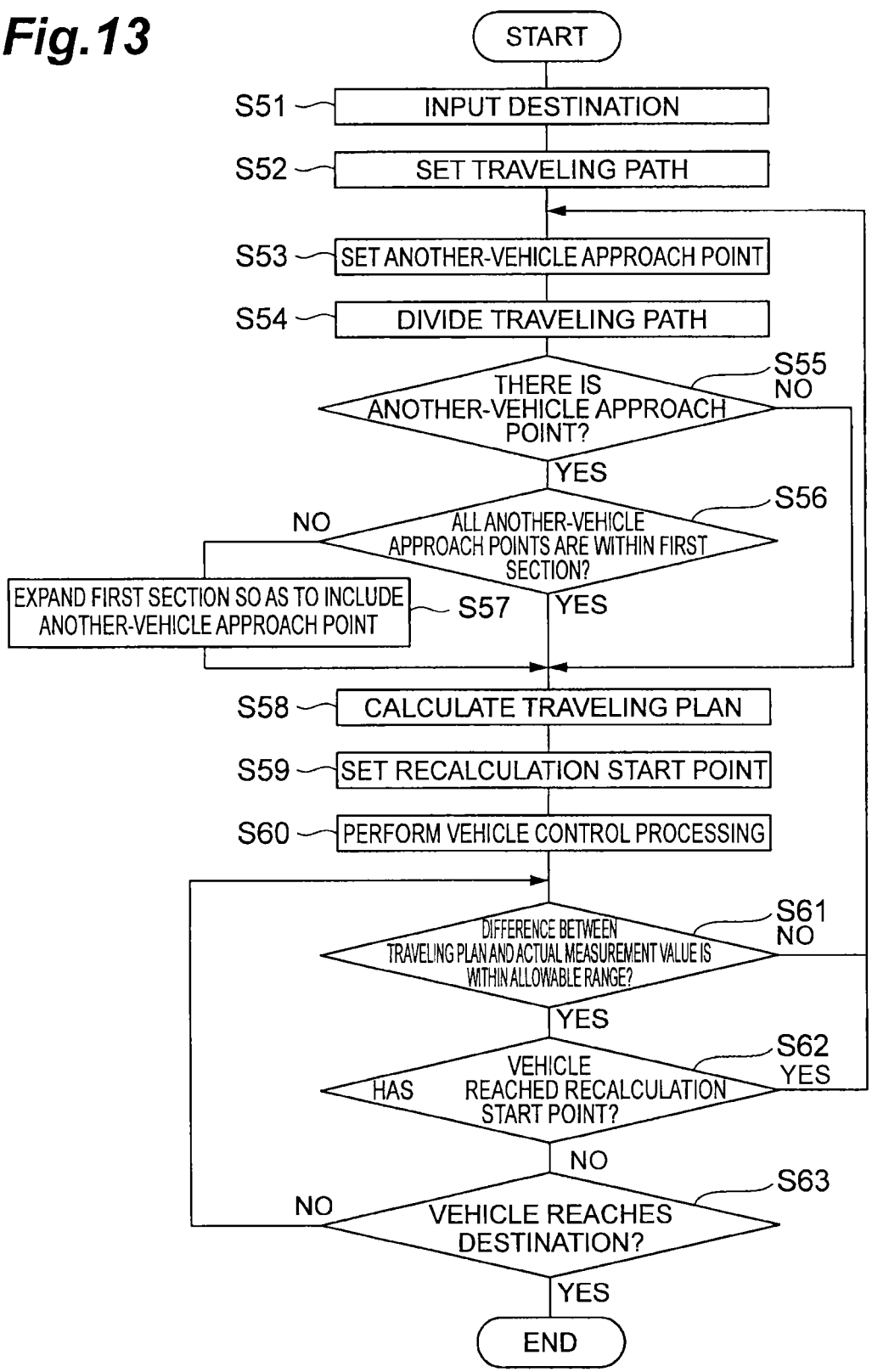
FIG. 13 is a flowchart showing the operation of the vehicle control device according to the fourth embodiment.

As shown in FIG. 13, the traveling path setting unit 11 of the ECU 42 first recognizes the input of the destination P from the driver on the basis of the destination signal transmitted from the user interface 5 (S51). Next, the traveling path setting unit 11 sets the traveling path from the current position G of the vehicle to the destination P on the basis of the current position signal transmitted from the GPS receiver 3, the destination signal transmitted from the user interface 5, and the map signal transmitted from the map database 6 (S52).

When the traveling path setting unit 11 sets the traveling path, the another-vehicle approach point setting unit 43 calculates the margin time to collision TTC of the vehicle against another vehicle on the basis of the vehicle actual measurement signal transmitted from the vehicle sensor 4 and the another-vehicle signal transmitted from the another-vehicle detection unit 8. The another-vehicle approach point setting unit 43 sets, as an another-vehicle approach point, a point on the traveling path where the margin time to collision TTC is equal to or smaller than a predetermined value (S53). At this time, when the another-vehicle detection unit 8 does not detect another vehicle and when there is no point where the margin time to collision TTC of the vehicle against another vehicle is equal to or smaller than a predetermined value, no another-vehicle approach point is set.

Thereafter, the traveling path division unit 44 divides the traveling path set by the traveling path setting unit 11 into the first section A at a predetermined distance from the current position G of the vehicle and the second section B which is the section other than the first section A in the traveling path (S54). Subsequently, the traveling path division unit 44 determines whether or not there are another-vehicle approach points (S55). When it is determined that there are no another-vehicle approach points, the traveling path division unit 44 progresses to S58.

When it is determined that there are another-vehicle approach points, the traveling path division unit 44 determines whether or not all another-vehicle approach points are in the first section A (S56). When it is determined that all another-vehicle approach points are in the first section A, the traveling path division unit 44 progresses to S58. When it is determined that all another-vehicle approach points are not in the first section A, the traveling path division unit 44 expands the first section A so as to include all another-vehicle approach points (S57). Thereafter, the process progresses to S58.

In S58, the traveling plan calculation unit 13 calculates the first traveling plan according to the first section A and the second traveling plan according to the second section B in the traveling path. At this time, the traveling plan calculation unit 13 coarsens calculation granularity in the second traveling plan compared to calculation granularity in the first traveling plan.

Next, the traveling plan calculation unit 13 sets the recalculation start point R in the first section A (S59). Subsequently, the traveling plan calculation unit 13 starts to transmit the vehicle control signal according to the calculated first and second traveling plans to the vehicle control unit 7 (S60). The vehicle control unit 7 drives the engine, the steering actuator, the brake system, and the like of the vehicle in accordance with the vehicle control signal transmitted from the traveling plan calculation unit 13, thereby performing vehicle control.

If the traveling plan calculation unit 13 transmits the vehicle control signal, the recalculation condition determination unit 14 of the ECU 42 determines whether or not the difference between the actual measurement value of the traveling state of the vehicle and the vehicle control target value of the first traveling plan is within the allowable range on the basis of the vehicle actual measurement signal transmitted from the vehicle sensor 4 (S61). When it is determined that the difference between the actual measurement value and the vehicle control target value of the first traveling plan is not within the allowable range, the recalculation condition determination unit 14 determines that the recalculation condition is satisfied, and returns to S53 again.

When it is determined that the difference between the actual measurement value and the vehicle control target value of the first traveling plan is within the allowable range, the recalculation condition determination unit 14 determines whether or not the vehicle reaches the recalculation start point R set by the traveling plan calculation unit 13 on the basis of the current position signal transmitted from the GPS receiver 3 (S62). When it is determined that the vehicle has reached the recalculation start point R, the recalculation condition determination unit 14 determines that the recalculation condition is satisfied, and returns to S53 again. When the recalculation condition determination unit 14 determines that the vehicle has not reached the recalculation start point R, the traveling plan calculation unit 13 determines whether or not the vehicle reaches the destination P on the basis of the current position signal transmitted from the GPS receiver 3 (S63). When it is determined that the vehicle has not reached the destination P, the traveling plan calculation unit 13 returns to S61 again. When it is determined that the vehicle has reached the destination P, the traveling plan calculation unit 13 ends the vehicle control processing.

According to the vehicle control device 41 of the fourth embodiment described above, it is possible to obtain the same effects of the vehicle control device 1 of the first embodiment. According to this vehicle control device 41, since the another-vehicle approach point where the margin time to collision TTC of the vehicle against another vehicle is equal to or smaller than a predetermined value is included in the first section A, it is possible to realize reliable vehicle control along the first traveling plan with the secured precision when another vehicle approaches. Therefore, according to this vehicle control device 41, it is possible to achieve improvement in vehicle safety with respect to another vehicle while achieving reduction in the calculation time of the entire traveling plan. Although in the fourth embodiment, the traveling path is divided taking into consideration the approach of another vehicle, the traveling path may be divided taking into consideration obstacles, such as pedestrians or buildings.

Although the preferred embodiments of the invention have been described, the invention is not limited to the foregoing embodiments.

For example, appropriate combinations of the foregoing first to fourth embodiments may be used, and the configuration of all embodiments may be combined. In this case, the traveling plan calculation unit 13 may change the calculation condition of the second traveling plan in accordance with the vehicle control policy set in advance by the driver or the like. That is, if the driver or the like inputs the vehicle control policy, such as safety-oriented, mileage-oriented, or ride quality-oriented, to the user interface 5, the traveling plan calculation unit 13 changes the calculation condition of the second traveling plan so as to minimize the effect on the vehicle control policy input from the driver, that is, a significant item. The calculation condition includes the calculation model which is used to calculate the second traveling plan, the precondition for calculation, or the like.

Specifically, when the driver sets safety-oriented or ride quality-oriented as the vehicle control policy, as the calculation condition, it is assumed that time-series data of the control target value of the vehicle position in the second traveling plan, that is, the target traveling line of the vehicle is aligned with the road center, making it possible to reduce the calculation time without significantly affecting safety or ride quality. In this case, since there is a possibility that an offset of a target traveling line occurs in the boundary of the first section A and the second section B, processing for complementing the target traveling line is performed in conjunction.

When the driver sets mileage as the vehicle control policy, that is, a significant item, a jerk limit to the calculation condition in the second traveling plan is lowered, making it possible to reduce the calculation time without significantly degrading mileage. In this way, the calculation condition of the second traveling plan is changed in accordance with the vehicle control policy set by the driver, thereby achieving reduction in the calculation time while preventing coarseness of calculation granularity of the second traveling plan from significantly affecting the vehicle control policy. Accordingly, when there is a possibility that the calculation time exceeds a specified time with the expansion of the first section A, the calculation condition is changed in the above-described manner to coarsen calculation granularity so as not to affect the vehicle control policy, thereby achieving reduction in the calculation time. Even when the vehicle control policy is not set in advance, a significant item may be automatically determined from the traveling environment of the vehicle or the like, and the calculation condition of the second traveling plan may be changed.

In the second and third embodiments, when the end point Ae of the first section A is included in the curved section C or the gradient-changing section D, instead of the first section A in the next traveling path division, the current first section A may be expanded so as to include the entire curved section C or gradient-changing section D.

The first section A is not limited to the section at a predetermined distance from the current position G of the vehicle, and an arbitrary section in the traveling path may be selected. The first section A is not a continuous integrated section, and may be constituted by a plurality of sections with the second section B interposed therebetween. For example, while the curved section C or the gradient-changing section D set in the traveling path may not be included in the continuous first section A after the vehicle approaches, calculation may be performed in advance with the entire curved section C or gradient-changing section D in the traveling path as the first section A.

INDUSTRIAL APPLICABILITY

The invention is usable in a vehicle control device which controls a vehicle along a traveling plan.

REFERENCE SIGNS LIST

1, 21, 31, 41: vehicle control device, 3: GPS receiver, 4: vehicle sensor, 5: user interface, 6: map database, 7: vehicle control unit, 8: another-vehicle detection unit, 11: traveling path setting unit, 12, 24, 34, 44: traveling path division unit, 13: traveling plan calculation unit, 14: recalculation condition determination unit, 23: curved section setting unit, 43: another-vehicle approach point setting unit, C: curved section, G: current position, P: destination, R: recalculation start point

The invention claimed is:

1. A vehicle control device which controls a vehicle along a traveling plan calculated in accordance with a traveling path to a destination of the vehicle, the vehicle control device comprising:
   a traveling path setting unit which sets the traveling path to the destination;
   a traveling path division unit which divides the traveling path into a first section and a second section;
   a traveling plan calculation unit which calculates a first traveling plan according to the first section and a second traveling plan according to the second section; and
   a recalculation condition determination unit which determines whether a difference between an actual measurement value of a traveling state of the vehicle and a vehicle control target value of the first traveling plan is within an allowable range,
   wherein the traveling plan calculation unit sets a recalculation start point, which is a point along the traveling path at a predetermined distance from a location of the vehicle, the vehicle reaches so as to start re-division of the traveling path by the traveling path division unit and recalculation of the traveling plan by the traveling plan calculation unit to the first section, and coarsens calculation granularity in the second traveling plan compared to calculation granularity in the first traveling plan, and
   wherein, when the recalculation condition determination unit determines that the difference is not within the allowable range, a recalculation condition is satisfied and the traveling path division unit again divides the traveling path and the traveling plan calculation unit again calculates the first traveling plan and the second traveling plan.

2. The vehicle control device according to claim 1, wherein the traveling path division unit includes a section of the traveling path at a predetermined distance from the current position of the vehicle in the first section.

3. The vehicle control device according to claim 1, further comprising:
   a curved section setting unit which sets a section having a curvature equal to or greater than a predetermined value in the traveling path as a curved section,
   wherein the traveling path division unit includes the curved section in the first section.

4. The vehicle control device according to claim 1, further comprising:
- a gradient-changing section setting unit which sets a section of the traveling path having a gradient change ratio equal to or greater than a predetermined value as a gradient-changing section,
- wherein the traveling path division unit includes the gradient-changing section in the first section.

5. The vehicle control device according to claim 1, further comprising:
- an another-vehicle detection unit which detects another vehicle around the vehicle; and
- an another-vehicle approach point calculation unit which calculates an another-vehicle approach point where the margin time to collision between another vehicle detected by the another-vehicle detection unit and the vehicle is equal to or smaller than a predetermined value,
- wherein the traveling path division unit includes the another-vehicle approach point in the first section.

6. The vehicle control device according to claim 1,
- wherein the traveling plan calculation unit changes the calculation condition of the second traveling plan in accordance with a vehicle control policy set in advance.

* * * * *